United States Patent [19]

Bühler

[11] Patent Number: 5,389,109
[45] Date of Patent: Feb. 14, 1995

[54] PROCESS FOR THE PREPARATION OF THERMOMIGRATION-RESISTANT DYEINGS

[75] Inventor: Ulrich Bühler, Alzenau, Germany

[73] Assignee: Hoechst Mitsubishi Kasei Co., Tokyo, Japan

[21] Appl. No.: 980,259

[22] Filed: Nov. 23, 1992

[30] Foreign Application Priority Data

Dec. 5, 1991 [DE] Germany .............................. 4140152

[51] Int. Cl.⁶ ........................... D06P 5/08; D06P 1/18
[52] U.S. Cl. ............................................. 8/495; 8/639; 8/662
[58] Field of Search ................. 8/662, 639, 693, 696, 8/922, 495; 534/573, 575, 640, 644

[56] References Cited

U.S. PATENT DOCUMENTS

| | | | |
|---|---|---|---|
| 4,139,528 | 2/1979 | Fishwick et al. | 534/640 |
| 4,743,269 | 5/1988 | Haebler et al. | 8/639 |
| 5,038,415 | 8/1991 | Ueda et al. | 8/639 |

Primary Examiner—Paul Lieberman
Assistant Examiner—Margaret Einsmann
Attorney, Agent, or Firm—Connolly & Hutz

[57] ABSTRACT

The present invention relates to a process for the preparation of highly thermomigration-resistant dyeings on fiber materials composed entirely or in part of polyester, in which the fiber materials, after dyeing, are subjected to a heat treatment, characterized in that dyeing is carried out with one or more dyes of the general formula I

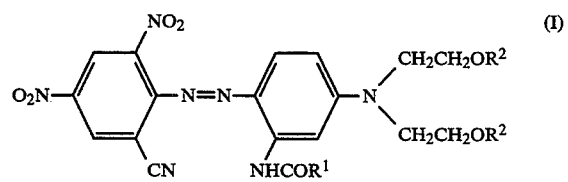

in which $R^1$ and $R^2$ independently of one another, are methyl and ethyl.

19 Claims, No Drawings

PROCESS FOR THE PREPARATION OF THERMOMIGRATION-RESISTANT DYEINGS

Textile materials, specifically dyed articles made of polyester fibres and blends thereof with natural fibres, for example cellulose fibres, are today expected to meet high washfastness requirements. Materials of higher quality are in general finished with synthetic resins and/or softeners for easy care, with no-iron, no-shrinking and no-creasing properties being particularly desirable (see, for example, Ullmanns Encyklopädie der technischen Chemie (Ullmann's Encyclopaedia of Industrial Chemistry), 4th edition, vol. 23, pages 77 ff).

It is generally known that dyed materials treated in this manner according to the present state of the art no longer, after a subsequent heat treatment, such as, for example, heat-setting at 180° C. which is customary in practice, have satisfactory wetfastness properties, in particular no satisfactory washfastness at 60° C. when treated with household detergents according to DIN 54017. The multifibre ribbon which is usually used as adjacent fabric in the washfastness test always shows extensive staining, in particular where cellulose acetate fibre and polyamide fibre portions are involved. This undesirable phenomenon is explained by the tendency of virtually all commercially available disperse dyes to thermomigrate. The dye which accumulates on the fibre surface as a result of the heat treatment is dissolved off during washing and stains the adjacent fabrics used in the abovementioned standard test to a greater or lesser extent. This effect becomes noticeable, for example, in a particularly disadvantageous manner in the case of sportswear articles made of textured polyester or polyester/cotton materials. As is known, these articles are often trimmed for decoration with pieces of white fabric made of the same or a different (for example polyamide) fibre material, which are then stained during washing.

This staining is particularly noticeable when the dyed materials, after dyeing, are given a synthetic resin finish and the heat treatment required for applying this synthetic resin finish takes place. Deep dyeings tend to be more highly staining than light coloured dyeings.

The present invention relates to a process for the preparation of highly thermomigration-resistant dyeings on fibre materials composed entirely or in part of polyester, in which the fibre materials, after dyeing, are subjected to a heat treatment, characterised in that dyeing is carried out with one or more dyes of the general formula I

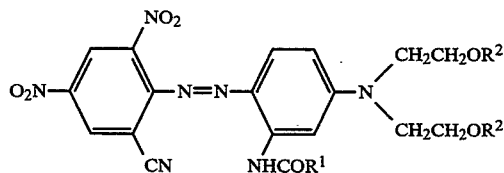

in which
$R^1$ and $R^2$, independently of one another, are methyl and ethyl.

Preferably, the sum total of carbon atoms in radicals $R^1$ and $R^2$ is 3 to 5.

A heat treatment is preferably understood to mean heating at 150° to 200° C. and particularly preferably at 170° to 190° C., in each case for about 30 seconds.

The process according to the invention is particularly advantageous if the fibre materials are given a synthetic resin finish before the heat treatment.

Some of the dyes to be used according to the invention are part of the disclosure of Japanese Patent 74 37 931. German Offenlegungsschrift 3,545,459 describes a process for the dyeing and printing of polyester fibre materials in navy hues, in which washfast navy dyeings are obtained after a thermal treatment if mixtures of dyes are used which contain, as the blue component, at least one dye of the general formula II

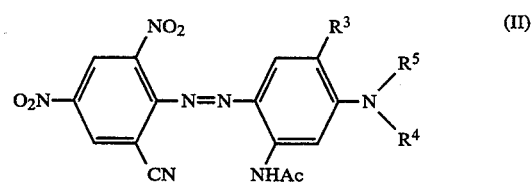

in which
Ac is an acyl radical,
$R^4$ is an alkyl or alkoxyalkyl radical,
$R^5$ is $R^4$ or an aralkyl radical and
$R^3$ is $R^4$, hydrogen, an alkoxy radical or, together with $R^5$, an alkylene group.

Given this state of the art, it was surprising and unforeseeable for one skilled in the art that dyeings having significantly improved wetfastness properties, such as washfastness and waterfastness and also having improved performance fastness properties, such as fastness to dry heat setting and lightfastness, could be obtained by the process according to the invention.

Moreover, the dyeings are distinguished by a neutral blue colour of high brilliance. Their shade is close to that of dyeings using anthraquinonoid blue dyes, such as C.I. Disperse Blue 73 or 56. However, compared with anthraquinone dyes, the dyes to be used according to the invention have clear ecological and economic advantages in combination with a significantly higher wetfastness level. Upon combination of the blue dyes to be used according to the invention with yellow dyes, it is possible to obtain clear green shades.

The dyes of the general formula I can also be used in mixtures with one another. Dye mixtures of this type preferably comprise three, particularly preferably two, dyes of the general formula I. The ratio of the various dyes of the general formula I can be varied within relatively wide limits. In general, the minimum weight proportion of one component is 10% and its maximum weight proportion 90%. In the case of dye mixtures comprising only two dyes of the general formula I, a weight ratio of 70:30 to 30:70 is preferred, i.e. the weight proportion of one dye is 30to 70%.

The dyes of the general formula I and their mixtures with one another can also be used in mixtures with other dyes.

It is preferred to use the dyes of the general formula I in a mixture with yellow and/or orange and/or red dyes.

Preferred red dyes are dyes of the general formula III

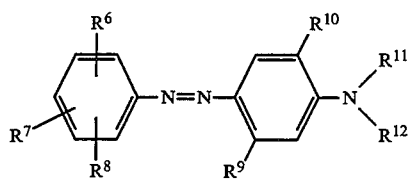 (III)

in which

R[6], R[7], R[8], independently of one another, are hydrogen, methyl, chlorine, bromine, nitro, $SO_2CH_3$, COOX or cyano, in which at least one radical must not be equal to hydrogen;

R[9] is hydrogen, X, NHCOX or $NHSO_2CH_3$;

R[10] is hydrogen or chlorine;

R[11] and R[12], independently of one another, are hydrogen, X, $(CH_2)_nOCOX$, $(CH_2)_nCOOX$ or $(CH_2)_nCN$, in which both radicals cannot simultaneously represent hydrogen;

X is linear $(C_1-C_4)$-alkyl, preferably $(C_1-C_2)$-alkyl and n is an integer from 1 to 4, preferably 2, dyes of the general formula IV

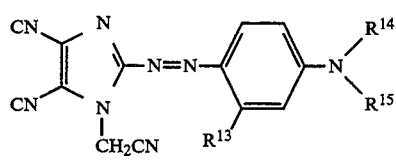 (IV)

in which

R[13] is hydrogen, chlorine, bromine or methyl and

R[14] and R[15], independently of one another, are linear $(C_1-C_4)$-alkyl, $(CH_2)_3COOCH_3$ or $(CH_2)_3COOC_2H_5$, and dyes of the general formula V

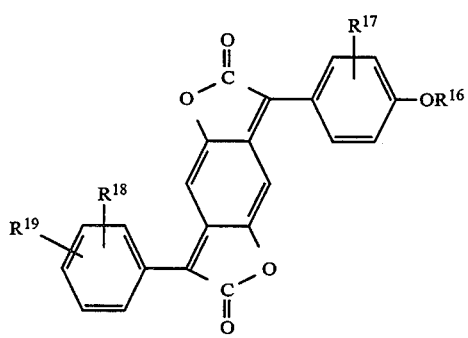 (V)

in which

R[16] is $(C_1-C_4)$-alkyl which is unsubstituted or substituted by hydroxyl, alkoxy having 1 to 4 C atoms, acyloxy having 2 to 4 C atoms, alkoxycarbonyl having 2 to 5 C atoms, cyano or halogen, R[17], R[18] and R[19], independently of one another, are $(C_1-C_4)$-alkyl, $(C_1-C_4)$-alkoxy or halogen.

Preferred orange dyes are those of the general formula (VI)

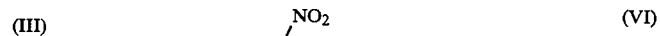 (VI)

in which

R[20] is hydrogen, linear $(C_1-C_4)$-alkyl or $(C_3-C_6)$-alkyl which is interrupted by one oxygen atom and R[21] is $(C_1-C_4)$-alkyl.

Preferred yellow dyes are those of the general formula VII

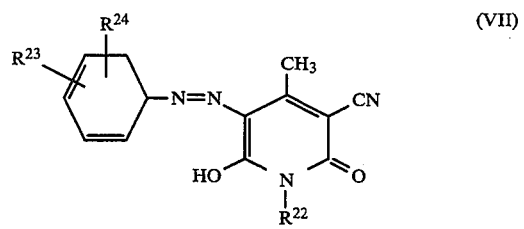 (VII)

in which

R[22] is hydrogen, linear $(C_1-C_4)$-alkyl or $(C_3-C_6)$-alkyl which is interrupted by one oxygen atom, and R[23] is hydrogen, $(C_1-C_4)$-alkyl, chlorine, nitro, substituted or unsubstituted alkoxycarbonyl having 1 to 4 C atoms in the alkoxy group, alkylcarbonyl having 2 to 4 C atoms, substituted or unsubstituted phenylcarbonyl, substituted or unsubstituted alkylaminosulphonyl having 1 to 4 C atoms in the alkyl group, substituted or unsubstituted phenoxysulphonyl or substituted or unsubstituted phenylsulphonyloxy and R[24] is hydrogen, chlorine or $(C_1-C_4)$-alkyl.

In the dye mixtures mentioned, the ratio of the various dyes can vary within relatively wide limits. The weight proportion of the dye of the general formula I or of the mixture of dyes of the general formula I is 5 to 95% by weight, depending on the shade to be obtained.

The dyes of the general formula I to be used according to the invention are preferably prepared by subjecting azo dyes of the formula VIII

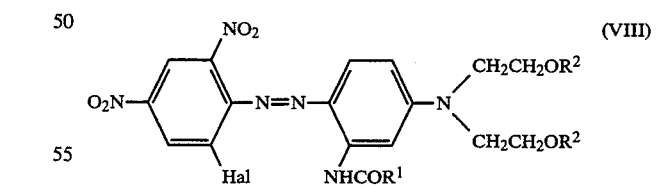 (VIII)

in which Hal is a halogen atom, such as chlorine or in particular bromine, in a manner known per se, for example by the procedure of DE-A 1,809,920, DE-A 1,809,921, GB-B 1,184,825, DE-B 1,544,563, DE-A 2,310,745, DE-B 2,456,495, DE-B 2,610,675, DE-A 2,724,116, DE-A 2,724,117, DE-A 2,834,137, DE A 2,341,109, U.S. Pat. No. 3,821,195, DE-A 2,715,034 or DE-A 2,134,896 to a nucleophilic exchange reaction, in which the cyanide ion $CN^\ominus$ is used as the nucleophile. In this reaction, Hal in the dye of the formula VIII is exchanged for CN. The dyes of the general formulae II to VII are known and can be prepared by methods known to one skilled in the art.

The mixtures mentioned can be prepared by mixing the separately prepared and finished individual components. Preferably, they are prepared by joint finishing of the separately prepared individual components. Mixtures of dyes of the general formula I with one another are preferably prepared by joint cyano exchange of the corresponding precursors of the general formula VIII.

The process according to the invention is highly suitable for the dyeing and printing of fibre materials composed entirely or in part of polyester. Preferably, the process according to the invention is used for the dyeing and printing of high-molecularweight polyester materials, in particular those based on polyethylene glycol terephthalates or blends thereof with natural fibre materials, preferably with cellulose.

The materials to be dyed can be present in the form of sheet-like or filament-like structures and have been processed, for example, to give yarns or woven or knitted textile materials. Dyeing of the fibre material mentioned using the dyes or dye mixtures mentioned is carried out in a manner known per se, preferably from an aqueous suspension, if appropriate in the presence of carriers, between 80° to about 110° C. by the exhaust method or by the HT method in a dyeing autoclave at from 110° to 140° C., or by the so-called thermofix process, in which the material to be dyed is padded with the dyeing liquor and then fixed at about 180° to 230° C. Printing of the materials mentioned can be carried out in a manner known per se by incorporating the dyes or dye mixtures mentioned in a printing paste and, in order to fix the dye, treating the material printed therewith, if appropriate in the presence of a carrier, with HT steam, pressurised steam or dry heat at temperatures of between 80° to 230° C. This gives dyeings and prints of very high colour strength and very good fastness properties, in particular good lightfastness, resistance to dry heat setting and thermomigration and washfastness and in particular very good M+S fastness (C4A wash).

The process according to the invention is particularly advantageous if the fibre materials, after dyeing, are given a synthetic resin finish, followed by the heat treatment.

Accordingly, finishing which, if desired, is carried out after dyeing takes place by known processes described in the relevant technical literature (see, for example, Ullmanns Encyklopädie der technischen Chemie (Ullmann's Encyclopaedia of Industrial Chemistry), 4th edition, vol. 23, pages 77 ff and references cited there) and thus known to one skilled in the art.

Examples of preferred processes are the dry-crosslinking process, the shock-drying-cure method and the postcure process.

Suitable chemicals for use in these processes for the high-quality finishing of polyester/cellulose blended fabrics are those suitable for crosslinking the cellulose molecules of the fibres.

Preference is given to N-hydroxymethyl or N-methoxymethyl derivatives of urea, such as, for example, bis(hydroxymethyl)urea and bis(methoxymethyl)urea, of melamine, such as, for example, hexamethoxymethylmelamine, of 2-imidazolidinones, such as, for example, bis(hydroxymethyl)ethyleneurea and bis(hydroxymethyl)dihydroxyethyleneurea or of other heterocycles, such as, for example, bis(hydroxymethyl)propyleneurea, bis(hydroxymethyl)hexahydrotriazinones and bis(methoxymethyl)urone.

Finishing can also comprise a treatment with softeners. The softeners used are in particular compounds having a hydrophilic and a hydrophobic molecule portion which, however, otherwise can have a completely different constitution. Examples of anionic softeners are fatty acid salts, salts of sulphuric esters or sulphonic acids and condensation products of fatty acids with compounds containing sulphonate groups. Examples of nonionic softeners are ethoxylation products of fatty acids, fatty alcohols, fatty acid amides and fatty amines. Preference is given to cationic softeners, such as, for example, salts or quaternised compounds of tertiary amines, amino esters and amino amides.

In the dye liquors and printing pastes used in the above applications, the dyes or dye mixtures should be present as finely divided as possible.

The dispersion of the dyes is carried out in a manner known per se by dispersing the dye formed during manufacture together with dispersants in a liquid medium, preferably in water, and subjecting the mixture to the action of shearing forces, as a result of which the dye particles originally present are comminuted mechanically to such an extent that an optimum specific surface area is achieved and sedimentation of the dye is minimised. The particle sizes of the dye are in general between 0.5 and 5 μm, preferably about 1 μm.

The invention is illustrated in more detail by the examples which follow. The percentages given are by weight.

EXAMPLE 1 a) 53.9 g of the dye of the formula VIII

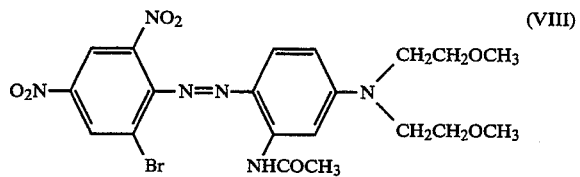

are introduced at 70° to 75° C. into a suspension of 100 ml of dimethyl sulphoxide, 2.1 g of sodium cyanide and 7.1 g of copper(I) cyanide, and the mixture is stirred at this temperature for 30 minutes. The temperature is then raised to 110° C. for 30 minutes, and the batch is then slowly cooled with stirring, the product is filtered off with suction, washed with 45 ml of dimethyl sulphoxide, 7.5% aqueous ammonia solution and water and dried under reduced pressure. This gives 38 g of the dye of the formula Ia

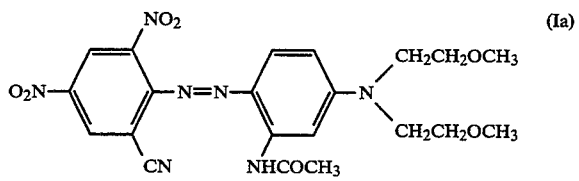

which has its absorption maximum at 607 nm.

b) 1 g of this dye is stirred into 2000 ml of water in finely dispersed form. 2.0 g of sodium acetate and 1.0 g of a commercially available dispersant based on a naphthalenesulphonic acid/formaldehyde condensation product are added to the dispersion thus obtained, and the mixture is brought to a pH of 4–5 with acetic acid. The dye liquor thus obtained is entered with 100 g of a 70:30 polyester/staple viscose blend fabric, and the fabric is dyed at 130° C. for 45 minutes. It is then rinsed, reduction cleared at 70° to 80° C. for 15 minutes using a 0.2% sodium dithionite solution, rinsed again and dried. The dyeing thus produced is subjected to resin finishing by impregnating it with an aqueous solution containing, per litre, 40 g of reactive resin based on dimethyloldihydroxyethyleneurea, 20 g of a melamine resin based on partially etherified methylol melamines, 20 g of a nonionic polyethylene emulsion, 20 g of an anionic softener based on silicone and 8 g of a catalyst based on amine salt, dried at 100° C. for one minute and heated at 180° C. for 30 seconds. In this manner, a resin finished blue dyeing of high colour strength and very good colouristic properties and perfect washfastness at 60° C. was treated with ECE detergents according to DIN 54017/C2.

The polyamide portion of the adjacent multi-fibre ribbon included in the wash shows staining which on the grey scale is evaluated as 4–5.

COMPARATIVE EXAMPLE

The procedure of Example 1 is repeated, except that the dye of Example 1 is replaced by the dye of the formula

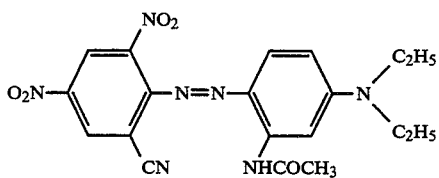

(Example A from DE-A 3,545,459), to give likewise a blue dyeing of high colour strength which, however, after the synthetic resin finish stains the adjacent multi-fibre ribbon considerably more extensively during washing. The staining of the polyamide portion has to be evaluated on the grey scale as 3.

EXAMPLE 2

Blue dyeings of high colour strength and very good fastness properties are obtained in the same manner as in Example 1 when using the dye of the formula Ib

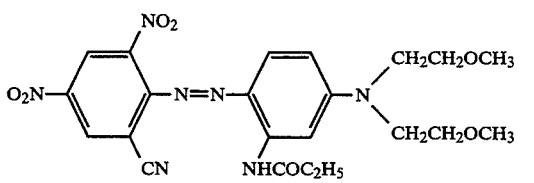

EXAMPLE 3

20.0 g of the dye of the formula Ic

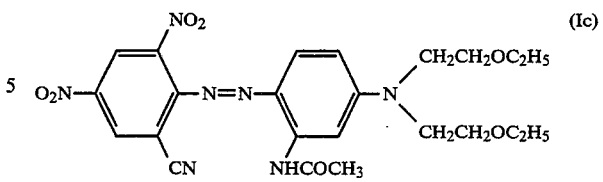

are incorporated in finely divided form in a printing paste containing 45.0 g of carob seed flour, 6.0 g of sodium m-nitrobenzenesulphonate and 3.0 g of citric acid per 1000 g. When a polyester/staple viscose blend fabric is printed using this printing paste, the printed fabric is steamed after drying at a steam pressure of 1.5 atmospheres gauge for 15 minutes, rinsed, soaped, rinsed again and subjected to finishing as described in Example 1, a blue print of high colour strength and very good colouristic properties is obtained.

EXAMPLE 4

A mixture of 0.16 g of the dye of the formula Id

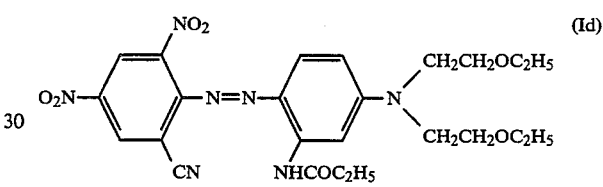

and 0.22 g of the yellow dye of the formula VII, in which $R^{22}$ is ethyl, $R^{23}$ is 2-nitro and $R^{24}$ is 4-chloro, is used in finished form as described in Example 1 for preparing a resin finished dyeing. A green dyeing having good resistance to thermomigration is obtained.

I claim:

1. Process for the preparation of highly thermomigration-resistant dyeings on fibre materials comprising polyester wherein the fibre materials, after dyeing, are subjected to a heat treatment, characterized in that dyeing is carried out with one or more dyes of the general formula I

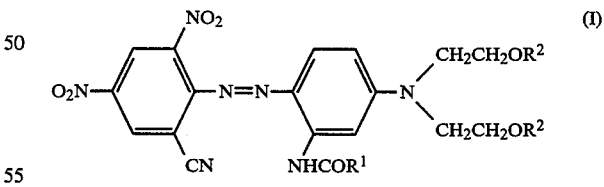

in which $R^1$ and $R^2$, independently of one another, are methyl and ethyl.

2. Process according to claim 1, characterized in that the sum total of carbon atoms in radicals $R^1$ and $R^2$ is 3 to 5.

3. Process according to claim i characterized in that the dyes of the general formula I are used in a mixture with yellow, orange, or red dyes.

4. Process according to claim 3, characterized in that the red dyes used are dyes of the general formula III

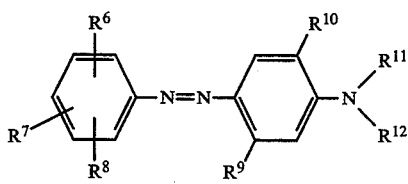

(III)

in which $R^6$, $R^7$, $R^8$, independently of one another, are hydrogen, methyl, chlorine, bromine, nitro, $SO_2CH_3$, COOX or cyano, in which at least one radical must not be equal to hydrogen;

$R^9$ is hydrogen, X, NHCOX or $NHSO_2CH_3$;

$R^{10}$ is hydrogen or chlorine;

$R^{11}$ and $R^{12}$, independently of one another, are hydrogen, X, $(CH_2)_nOCOX$, $(CH_2)_nCOOX$ or $(CH_2)_nCN$, in which both radicals cannot simultaneously represent hydrogen;

X is linear $(C_1-C_4)$-alkyl and n is an integer from 1 to 4, dyes of the general formula IV

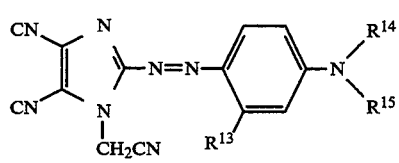

(IV)

in which $R^{13}$ is hydrogen, chlorine, bromine or methyl and $R^{14}$ and $R^{15}$, independently of one another, are linear $(C_1-C_4)$-alkyl, $(CH_2)_3COOCH_3$ or $(CH_2)_3COOC_2H_5$, and dyes of the general formula V

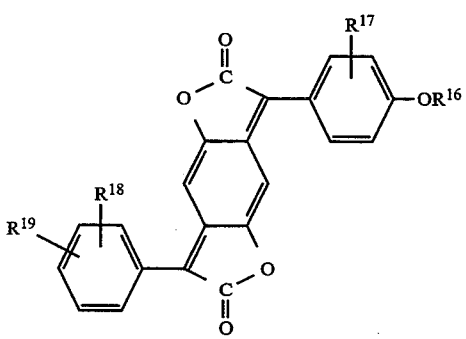

(V)

in which $R^{16}$ is $(C_1-C_4)$-alkyl which is unsubstituted or substituted by hydroxyl, alkoxy having 1 to 4 C atoms, acyloxy having 2 to 4 C atoms, alkoxycarbonyl having 2 to 5 C atoms, cyano or halogen, $R^{17}$, $R^{18}$ and $R^{19}$, independently of one another, are $(C_1-C_4)$-alkyl, $(C_1-C_4)$-alkoxy or halogen.

5. Process according to claim 4 wherein X is $(C_1-C_2)$-alkyl.

6. Process according to claim 4 wherein n is 2.

7. Process according to claim 3, characterized in that the orange dyes used are dyes of the general formula VI

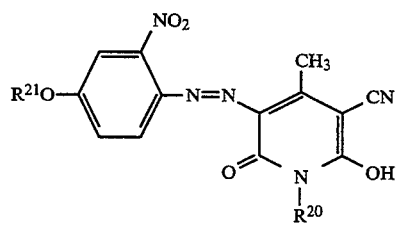

(VI)

in which $R^{20}$ is hydrogen, linear $(C_1-C_4)$-alkyl or $(C_3-C_6)$-alkyl which is interrupted by one oxygen atom and $R^{21}$ is $(C_1-C_4)$-alkyl.

8. Process according to claim 3, characterized in that the yellow dyes used are dyes of the general formula VII

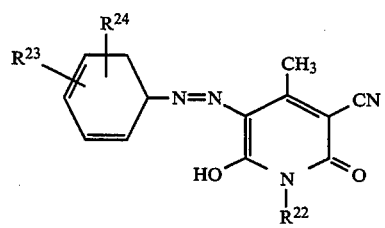

(VII)

in which $R^{22}$ is hydrogen, linear $(C_1-C_4)$-alkyl or $(C_3-C_6)$-alkyl which is interrupted by one oxygen atom, and $R^{23}$ is hydrogen, $(C_1-C_4)$-alkyl, chlorine, nitro, substituted or unsubstituted alkoxycarbonyl having 1 to 4 C atoms in the alkoxy group, alkylcarbonyl having 2 to 4 C atoms, substituted or unsubstituted phenylcarbonyl, substituted or unsubstituted alkylaminosulphonyl having 1 to 4 C atoms in the alkyl group, substituted or unsubstituted phenoxysulphonyl or substituted or unsubstituted phenylsulphonyloxy and $R^{24}$ is hydrogen, chlorine or $(C_1-C_4)$-alkyl.

9. Process according to claim 1 characterized in that the fibre materials, after dyeing, are given a synthetic resin finish, followed by the heat treatment.

10. The process as claimed in claim 1, wherein said heat treatment is from 150° to 200° C.

11. The process as claimed in claim 10, wherein said heat treatment is from 170° to 190° C. for about 30 seconds.

12. The process according to claim 1, wherein two different dyes of formula (I) are used.

13. The process according to claim 12, wherein the minimum proportion of one dye is 10% and its maximum proportion is 90%.

14. The process as claimed in claim 12, wherein a weight ratio of 70:30 to 30:70 is for the two dyes of general formula (I).

15. The process according to claim 8, wherein $R^{23}$ is hydrogen, $(C_1-C_4)$-alkyl, chlorine, substituted or unsubstituted alkoxycarbonyl having 1 to 4 C atoms in the alkoxy group, alkylcarbonyl having 2 to 4 C atoms, substituted or unsubstituted phenylcarbonyl, substituted or unsubstituted alkylaminosulphonyl having 1 to 4 C atoms in the alkyl group, substituted or unsubstituted phenoxysulphonyl or substituted or unsubstituted phenylsulphonyloxy.

16. The process as claimed in claim 8, wherein $R^{22}$ is hydrogen or $(C_3-C_6)$-alkyl which is interrupted by one oxygen atom.

17. The process according to claim 15, wherein $R^{22}$ is hydrogen or $(C_3-C_6)$-alkyl which is interrupted by one oxygen atom.

18. The process according to claim 4, wherein $R^{10}$ is chlorine.

19. The process as claimed in claim 4, wherein $R^9$ is NHCOX or $NHSO_2CH_3$.

* * * * *